United States Patent
Saitou et al.

(10) Patent No.: US 6,487,498 B2
(45) Date of Patent: Nov. 26, 2002

(54) VEHICLE CRUISING CONTROL DEVICE AND METHOD

(75) Inventors: Hiroshi Saitou, Kanagawa-ken (JP); Rumi Minakawa, Kanagawa-ken (JP); Akio Sumizawa, Kanagawa-ken (JP)

(73) Assignees: Nissan Motor Co., Ltd., Kanagawa-Ken (JP); Xanavi Informatics Corporation, Kanagawa-Ken (JP)

(*) Notice: Subject to any disclaimer, the term of this patent is extended or adjusted under 35 U.S.C. 154(b) by 0 days.

(21) Appl. No.: 09/790,909

(22) Filed: Feb. 23, 2001

(65) Prior Publication Data

US 2001/0044696 A1 Nov. 22, 2001

(30) Foreign Application Priority Data

Feb. 24, 2000 (JP) ........................................ 2000-047338

(51) Int. Cl.[7] .............................................. G01C 21/00
(52) U.S. Cl. .......................................... 701/213; 701/93
(58) Field of Search .......................... 701/93, 25, 200, 701/211, 213; 342/357.06

(56) References Cited

U.S. PATENT DOCUMENTS 5,878,364 A * 3/1999 Kuroda et al. ................. 701/56

FOREIGN PATENT DOCUMENTS

JP 10-184413 7/1998

* cited by examiner

*Primary Examiner*—Yonel Beaulieu
(74) *Attorney, Agent, or Firm*—McDermott, Will & Emery (57) ABSTRACT

A vehicle cruising control device has a vehicle-position/traveling-direction calculating circuit 21 which receives data from a GPS signal receiver 11, a vehicle speed sensor 12, an angular-velocity sensor 13 and a map data base 30 to specify a road on which the vehicle is traveling and a road property gain circuit 23 which gains a sort of road from the map data base 30, as road property. In the device, a driving force control unit 40 controls a vehicle driving unit 50 on the ground of the sort of road. If the map matching becomes to be improper, then the road property gain circuit 23 operates to maintain the road property just before malfunction of the map matching until a traveling-distance after malfunction of the map matching reaches a predetermined distance. The traveling-distance is calculated by a traveling-distance calculating circuit 22.

8 Claims, 5 Drawing Sheets

VEHICLE CRUISING CONTROL DEVICE AND METHOD

BACKGROUND OF THE INVENTION

The present invention relates to a cruising control device for vehicles, such as automobiles, which controls the driving force characteristics of the vehicle in accordance with the traveling information of the vehicle.

Recently, a load-information display apparatus, namely, navigation systems has come into wide use for vehicles, such as automobiles. Further, the recent vehicles are in course of carrying a cruising control device that controls the driving-force characteristics so as to accord with a cruising road, on the ground of information brought by the navigation system.

In the current navigation system, the vehicle position is estimated by employing a satellite navigation to calculate the vehicle position on basis of signals from a GPS satellite and a self-support navigation to calculate the vehicle position on basis of velocity pulses and gyro-signals, together. Further in the navigation system, there is also carried out a so-called "map matching" where the vehicle position is mated with the present road map in view of removing display errors on the map.

Figure 5:
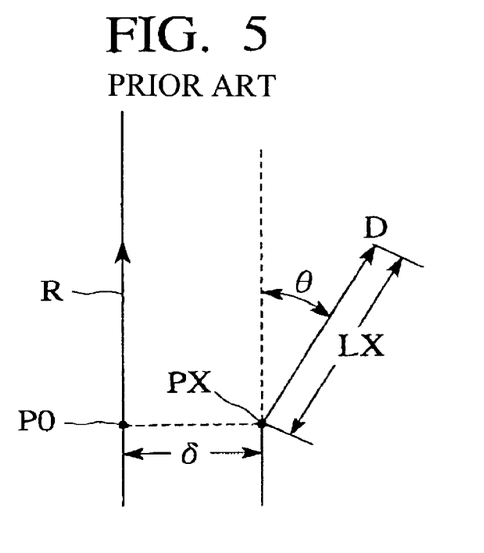
FIG. 5 is a diagram showing a basic principle of the map matching of the prior art.

FIG. 5 illustrates the basic principles of map matching. Based on GPS measurements, vehicle speed pulses and gyro-sensor outputs, it is first executed to calculate both the present vehicle's position PX (on estimation) and traveling direction D. Nevertheless, since the so-calculated position PX and traveling direction D are not always included in a road existing on the map, it is next executed to determine a road R on which the vehicle is estimated to be traveling. This is the very function called "map matching".

In detail, it is first executed to select the road R in the vicinity of the present position PX from the map data and subsequently calculate a distance δ between the road R and the position PX. Next, it is carried out to calculate an angular difference Θ between the calculated traveling direction D and the selected road R. Here, if the so-obtained values δ and Θ are less than predetermined reference values together, it is judged that the vehicle is now traveling on the selected road R and therefore, the vehicle position is corrected for a position PO.

In case of existing a plurality of roads near the point PX, then there will be selected one of the roads, which is the closest to the point PX and also has the smallest angular difference Θ. By repeating the above processes at predetermined intervals, it allows the map matching to be realized, so that the present vehicle position is displayed on the specified road in the map.

In the map matching process mentioned above, however, there sometimes arise problems that the accuracy of satellite navigation is deteriorated since the receiving sensitivity of the GPS satellite is reduced due to an environment about the road and that the accuracy of self-support navigation is deteriorated by errors in the traveling-distance calculated from the vehicle speed pulses, due to the expansion of tires at the vehicle's traveling at a high speed.

Then, since the above point PX and traveling direction D are greatly deviated from the rightful road position PO and road direction respectively, the map matching process is impossible of judgement which of the roads should be matched with the above point PX, causing a result of no road coming under the point PX and traveling direction D.

Further, there is a possibility that an accurate traveling direction of the vehicle is not determined upon judgement that the vehicle is whirling round while that the vehicle is abruptly turning right or left, causing a phenomenon of impossible map matching.

Figure 6A:
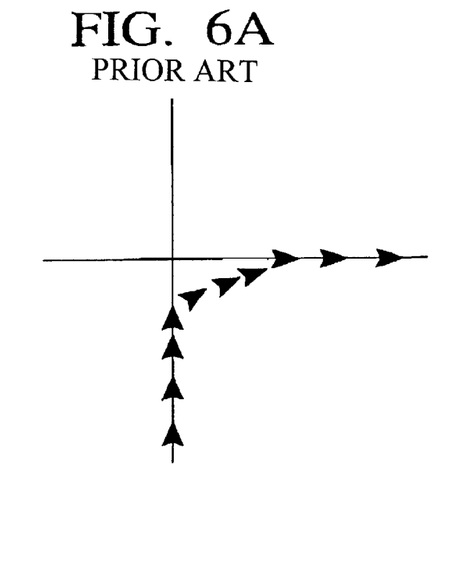
FIGS. 6A and 6B are views showing respective traveling routes of the vehicles at intersections.
Figure 6B:
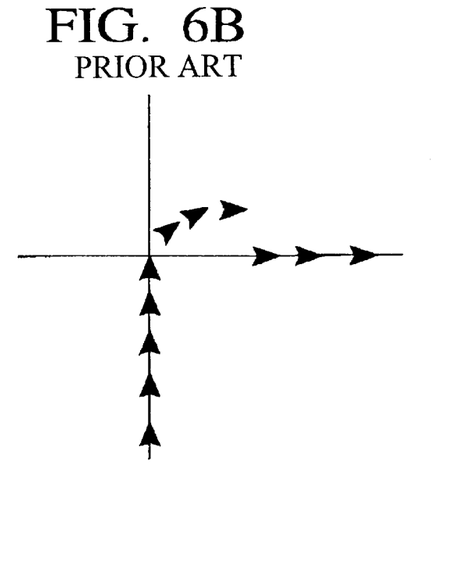

Additionally, as shown in FIGS. 6A and 6B, if the vehicle is subjected to its undershoot (FIG. 6A) or overshoot (FIG. 6B) during the vehicle's turning left or right at intersection, then the navigation system may judge that the system is now impossible of map matching (i.e. failure of map matching). Alternatively, when the vehicle turns sharp after it has been traveling on a straight line of freeway for a long time continuously, the navigation system also judges that the system has a failure of map matching, causing a phenomenon that the vehicle position on display is deviated from a road that the vehicle is actually traveling on.

Meanwhile, in a vehicle cruising control device where the vehicle's driving force characteristics is controlled on the ground of the present road property information (e.g. traveling on freeway or narrow lane, etc.) while employing the road information brought by the above navigation system, if the above-mentioned problem (i.e. failure of map matching) arises in the navigation system, then the vehicle cruising control device cannot obtain a designated information about the road property.

In order to cope with such a problem, Japanese Patent Publication (kokai) No. 10-184413 discloses a cruising control device that then takes measures of prohibiting the control itself; changing the frequency of controls; replacing the control with other control pattern; and so on.

However, when the vehicle repeats right and left turns on the roads in a grid pattern or the vehicle travels continuous curves, such as mountain pass road, there is a possibility that the judgement of failure of map matching occurs often. Consequently, a problem arises in the above-mentioned prior art device that the driving-force control pattern of the vehicle is frequently altered so as to produce a sense of incompatibility in the vehicle's behavior.

SUMMARY OF THE INVENTION

Under the above circumstance, it is an object of the present invention to provide a vehicle cruising control device that does not produce such a sense of incompatibility in the vehicle's behavior in spite of the failure of map matching.

According to the invention, the above-mentioned object is accomplished by a vehicle cruising control device for a vehicle, comprising:
- a road property detecting unit for detecting a road property of a road on which the vehicle is traveling; and
- a driving-force control unit for controlling driving-force characteristics of the vehicle in accordance with the detected road property,
- wherein, when the road property detecting unit is impossible to detect the road property, the driving-force characteristics of the vehicle on the ground of the road property which has been detected before the road property detecting unit becomes impossible to detect the road property.

DESCRIPTION OF THE PREFERRED EMBODIMENT

Referring to accompanying drawings, embodiments of the present invention will be described below.

Figure 1:
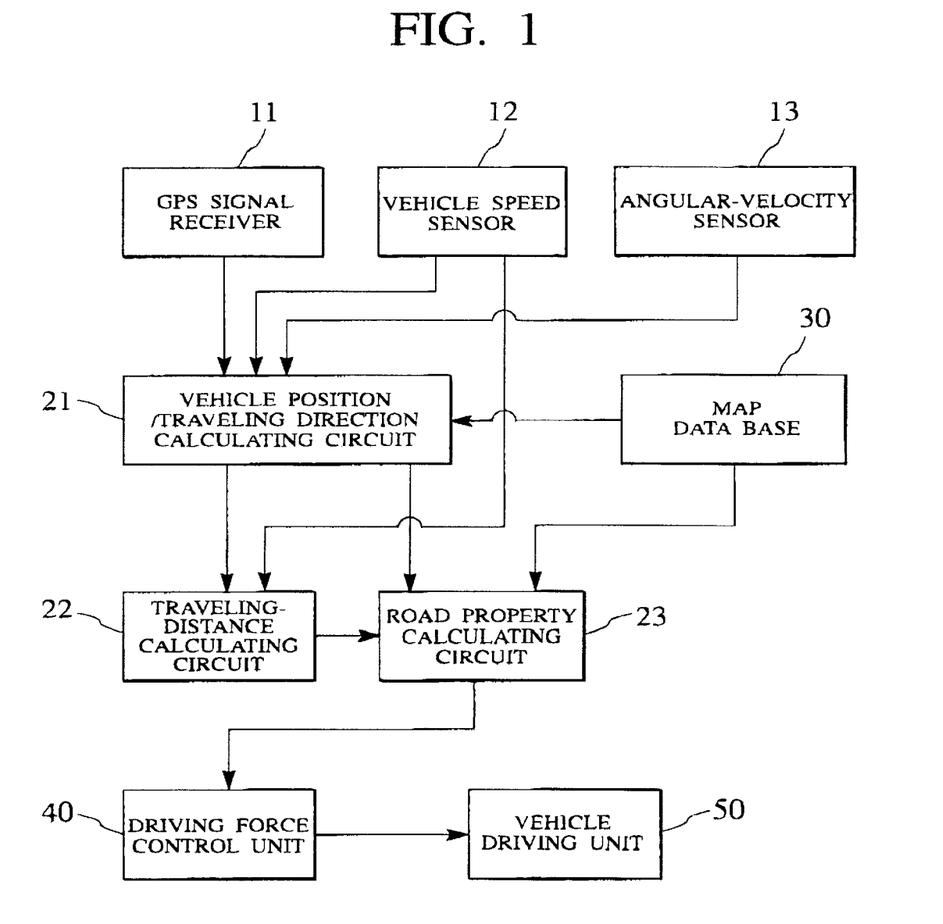
FIG. 1 is a block diagram showing the structure of the vehicle cruising control device in accordance with the first embodiment of the present invention.

FIG. 1 illustrates a vehicle cruising control device in accordance with the first embodiment of the invention. In the device, there are provided a GPS signal receiver 11, a vehicle speed sensor 12, an angular-velocity sensor 13 and a map data base 30, all of which are collectively connected to a "vehicle position" and "traveling direction" calculating circuit 21. Note, the vehicle position and traveling direction calculating circuit 21 will be expressed by a vehicle-position/traveling-direction calculating circuit 21, hereinafter. The GPS signal receiver 11 receives GPS signals to generate satellite cruising data, such as latitude and longitude, to the vehicle-position/traveling-direction calculating circuit 21.

The vehicle speed sensor 12 operates to detect a speed of the vehicle (vehicle speed, hereinafter).

The angular-velocity sensor 13 is composed of a vibrating gyro, an optical fiber gyro, etc. to calculate an angular-velocity of the vehicle.

The map data base 30 corresponds to a CD-ROM or DVD-ROM where map data (e.g. road lines, latitude and longitude) and road information (e.g. sort of roads) are together stored.

While using the vehicle speed and the angular-velocity as self-cruising data together with satellite cruising data, the vehicle-position/traveling-direction calculating circuit 21 estimates the present position of vehicle and the traveling direction and further carries out a map-matching to match map data from the map data base 30 against the above-estimated results (i.e. vehicle position and traveling direction).

A traveling-distance calculating circuit 22 is connected with the vehicle-position/traveling-direction calculating circuit 21 and the vehicle speed sensor 12. The traveling-distance calculating circuit 22 integrates the vehicle speed during the vehicle's traveling to calculate the traveling-distance. At the traveling-distance calculating circuit 22, the traveling-distance is reset whenever the map matching is carried out in the vehicle-position/traveling-direction calculating circuit 21 successfully and immediately, the calculation of a traveling-distance from zero (in traveling-distance) is started again.

Further, the traveling-distance calculating circuit 22 retains a fixed reference distance LS, as a control reference in case of the incomplete map matching and also compares the above-calculated traveling-distance with the reference distance LS. In this case, the reference distance LS is set to 50 meters.

Connected with the vehicle-position/traveling-direction calculating circuit 21, the traveling-distance calculating circuit 22 and the map data base 30 is a road property gain circuit 23 which gains the sort of road as the road property information, from the map data base 30 on the ground of the information from the vehicle-position/traveling-direction calculating circuit 21. As the kinds of roads, there are included, for example, a freeway (high zone), a principal road (general zone), an alleyway (local zone), etc. all of which are stored in an inside memory of the road property gain circuit 23.

A driving force control unit 40 is connected with the road property gain circuit 23 to control a vehicle driving unit 50 as an object to be controlled by the driving force characteristics based on the kind of road stored in the inside memory of the road property gain circuit 23.

As the vehicle driving unit 50, an automotive engine has a throttle opening to be controlled in this embodiment.

Figure 2:
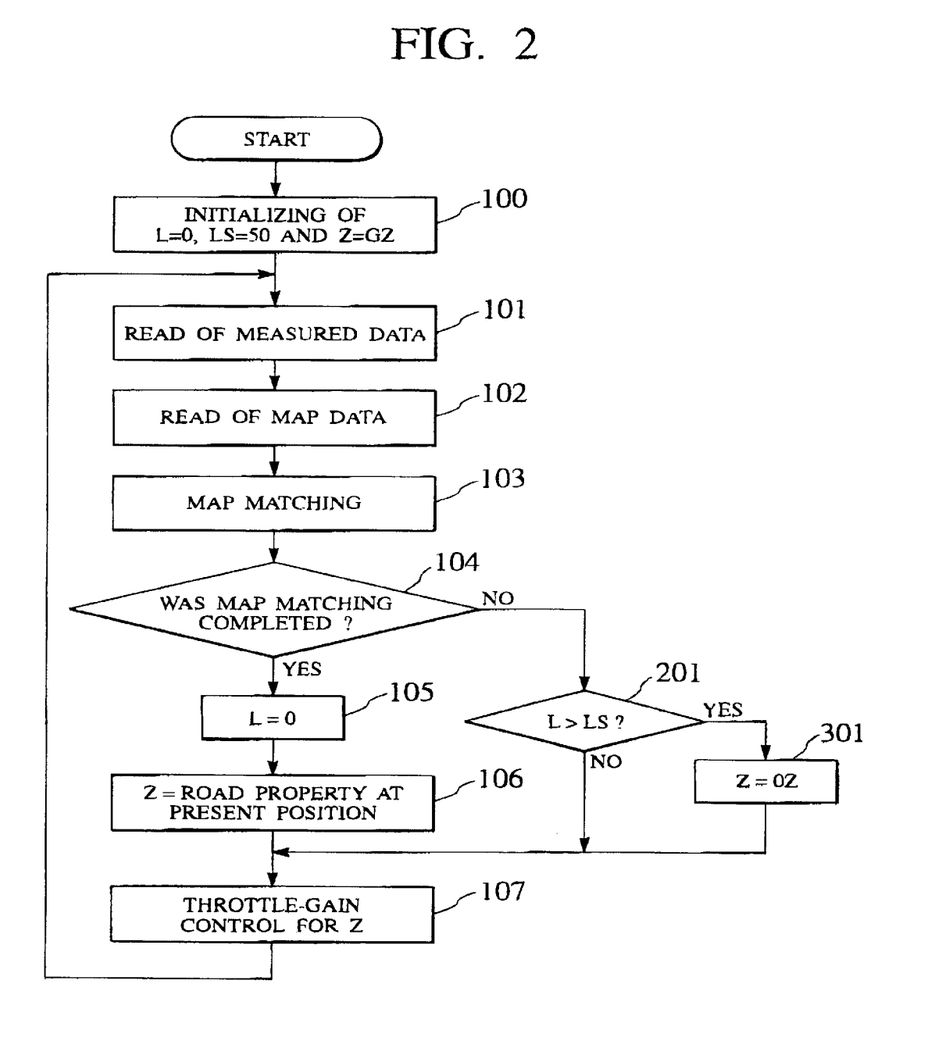
FIG. 2 is a flow chart showing the flow of operations of the vehicle cruising control device of FIG. 1.

FIG. 2 is a flow chart showing the flow of operation carried out by the above-mentioned structure.

At step 100, it is executed to establish the traveling-distance L of zero (meter) and the road kind Z of GZ (i.e. above principal road) as the initial control data at the starting point of the vehicle's traveling and thereupon, the vehicle begins to start. At step 101, the vehicle-position/traveling-direction calculating circuit 21 carries out the read-out of both satellite cruising data and self cruising data from the GPS signal receiver 11, the vehicle speed sensor 12 and the angular-velocity sensor 13.

At next step 102, the vehicle-position/traveling-direction calculating circuit 21 further carries out the read-out of map data from the map data base 30.

At step 103, it is executed to estimate the present position and the traveling direction of the vehicle on the ground of the measuring data that has been introduced at step 101 and furthermore, the map matching is carried out between the so-estimated results and the map data at step 102.

At step 104, by the vehicle-position/traveling-direction calculating circuit 21, it is judged whether or not the map matching has been carried out successfully. When the map matching has been completed (Yes at step 104), in other words, if it is judged that the vehicle is traveling on the specified road, then the routine goes to step 105.

At step 105, it is executed in the traveling-distance calculating circuit 22 to reset the traveling-distance L of zero (meter) where the calculation of traveling-distance L (=LX) is resumed.

Subsequently, at step 107, the driving force control device 40 gains the road kind Z of the specified road upon the map matching from the map data base 30 and renews the road kind into the road kind newly gaining the inside memory Z, for example, HZ (free way).

At step 107, it is executed in the driving force control device 40 to renew the throttle-gain target of the engine corresponding to the road kind Z stored in the inside memory of the road property gain circuit 23.

After completing the process at step 107, then the routine returns step 101.

Note, the control of throttle-gain is carried out by setting the magnification of a throttle opening against an accelerating-pedal opening to a designated value.

In case of the condition Z=GZ, i.e., the vehicle is traveling on a principal road, the magnification is established to be a middle value, thereby ensuring the normal driving characteristics.

In case of the condition Z=HZ, i.e., the vehicle is traveling on a freeway, the magnification is set to a large value so that a high engine torque can be obtained in spite of the driver's stepping on the accelerating pedal slightly, thereby ensuring the quick driving characteristics suitable for the freeway.

In case of the condition Z=LZ, i.e., the vehicle is traveling on an alleyway, the magnification is set to a small value to avoid the abrupt elevation of torque, thereby ensuring the gentle driving characteristics.

While, if the judgement at step 104 is No, that is, when the map matching is not accomplished successfully (for example, the vehicle being out of the road, the vehicle's right/left turning at intersection, etc.), then the routine goes to step 201.

At step 201, it is executed in the traveling-distance calculating circuit 22 to compare the traveling-distance LX with the predetermined reference distance LS (e.g. 50 m)

It is noted that in case of the map matching on completion, the traveling-distance LX is reset to zero at step 105, the above traveling-distance LX is equal to a vehicle's traveling-distance since the failure of map matching.

As a result of the above comparison, when the distance LX is less than the distance LS, then the routine goes to step 107 directly. In this case, since the road kind Z stored in the inside memory of the road property gain circuit 23 is unchanged as it is, the throttle-gain control of the engine at step 107 is maintained with the usual target value.

Note, if the map matching becomes to be successful while the distance LX is less than the distance LS, then the routine moves from step 104 to step 105 and sequent step 106 where the road kind Z in the inside memory of the road property gain circuit 23 is renewed corresponding to the specified road upon the map matching.

On the other hand, when it is judged at step 201 that the distance LX exceeds the distance LS, the routine goes to step 301 where the road kind Z in the inside memory is altered to OZ and subsequently, the routine goes to step 107.

Here, it should be noted that since the vehicle itself is traveling actually, the road kind OZ represents "except roads or a new road excluded from the map data.

In case of OZ, it is executed at step 107 that the driving force control unit 40 establishes a throttle gain identical to that in case of GZ (principal road).

In this way, the above-mentioned flow is repeated until the engine is stopped, that is, the power supply to the vehicle cruising control device of the invention is switched off.

In the embodiment, the above-mentioned steps 101–104 and 106 constitute the road property detecting unit of the invention and particularly, the steps 101–103 form the traveling-road detecting unit, while the steps 104 and 106 form the road property readout unit of the invention.

Alternatively, the operations at steps 105 and both steps 201 and 301 originating from step 104 form the road property readout unit of the invention.

Noted, although the road kind is picked up from the map data base 30, there may be caused a driver's sense of incompatibility in case of a difference between the so-gained road kind and the actual road condition due to road repair etc. Therefore, though it is not shown in the figure especially, the driving force characteristics based on the road kind may be released by detecting the driver's great manipulation for the accelerating pedal.

For example, if the driver's sense of incompatibility is produced at a low target value in throttle gain while the actual road has a width corresponding to the principal road in spite of the road kind Z equal to LZ (alleyway) from the map data, the driver's deep stepping on the accelerating pedal allows the low target value for alleyway to be canceled, so that it is changed into the throttle gain for the principal road.

Thus, according to the cruising control device of this embodiment where the driving-force characteristics is controlled by adjusting the throttle gain so as to correspond to the present road kind specified by the navigation system, when the failure of map matching occurs, then the device maintains to control the vehicle's driving force with the throttle-gain based on the road kind just before the failure of map matching, for a period from the failure of map matching till the vehicle's traveling of the designated reference distance LS. Subsequently, the device changes the above driving force control to the designated control corresponding to the failure of map matching. Consequently, there is no conventional problem of changing the control pattern whenever the map matching becomes to be impossible, whereby it is possible to abolish the sense of incompatibility in the vehicle's movement.

Further, since it is executed, as the designated control after the vehicle's traveling of the reference distance LS under the failure of map matching, to adopt the throttle gain corresponding to the road kind Z=GZ (principal road), there would be no great difference even if the so-established road kind is deviated from the actual road kind, thereby providing the vehicle with less feeling of incompatibility.

Additionally, since the recovery of appropriate map matching before reaching the reference distance LS allows the present throttle gain to be immediately renewed for a throttle gain corresponding to the road kind specified by the appropriate map matching, it is possible to maintain an appropriate cruising control suitable to the road where the vehicle is now traveling.

It is further noted that the order of steps 105 and 106 shown in FIG. 2 may be reversed in the modification.

Next, the second embodiment of the invention will be described below. According to this embodiment, the above reference traveling-distance is changed corresponding to the specified road kind while the reference traveling-distance is constant irrespective of the road kind in the previous embodiment.

Figure 3:
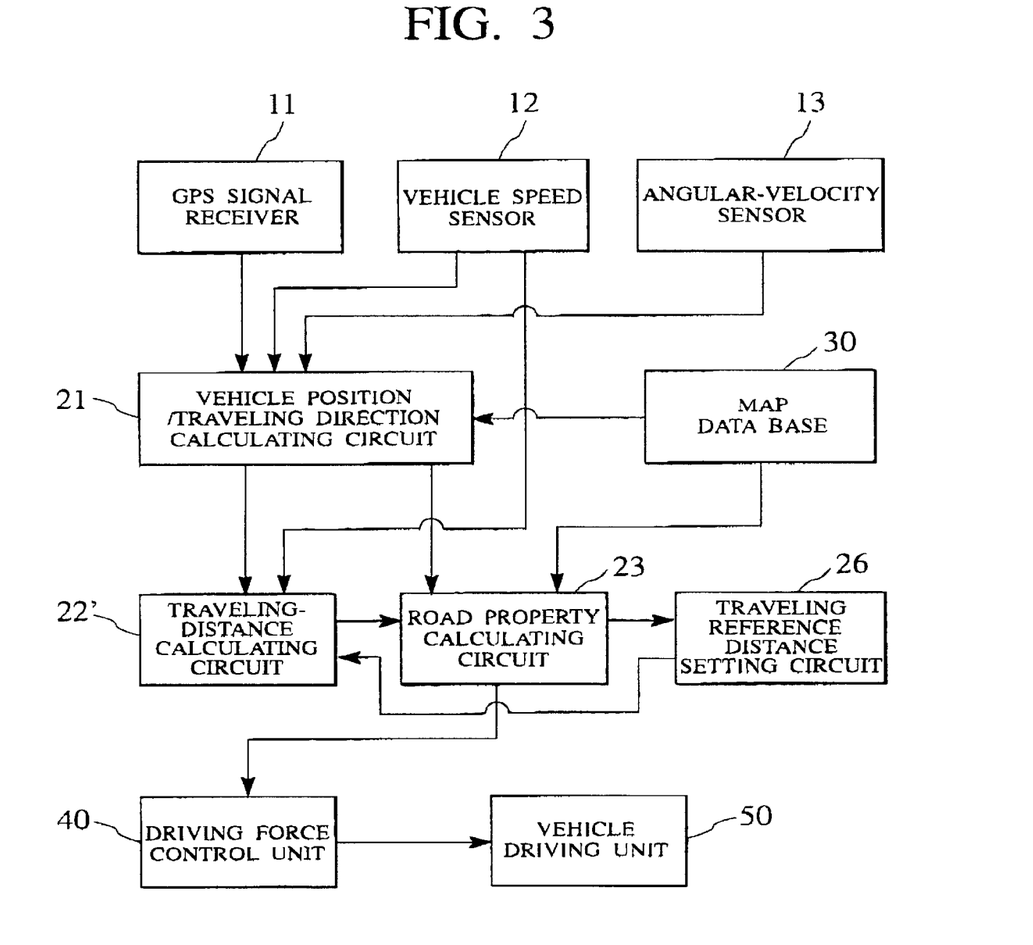
FIG. 3 is a block diagram showing the structure of the vehicle cruising control device in accordance with the second embodiment.

FIG. 3 shows the structure of the vehicle cruising device in accordance with the second embodiment of the invention.

The vehicle cruising device of the embodiment further includes a traveling reference distance setting circuit 26 which is connected with both of the road property gain circuit 23 and a traveling-distance calculating circuit 22'. The traveling reference distance setting circuit 26 retains a group of traveling reference distances LS for various road kinds, in the form of data map. The circuit 26 is adapted so as to output the traveling reference distance LS corresponding to the road kind stored in the inside memory of the road property gain circuit 23, to the traveling-distance calculating circuit 22'.

As to the traveling reference distances LS in data map, for example, there are established 50 (m) for principal road (GZ), 200 (m) for freeway (HZ) and 30 (m) for alleyway (LZ). The reason for such an establishment is as follows. Generally, the vehicle is apt to travel at high speed on a freeway. Under such a situation, once the navigation system has a failure of map matching, it takes a long traveling-distance to recover the operation of the navigation system for the normal condition. To the contrary, when the vehicle is traveling on an alleyway, then the vehicle speed is estimated to be relatively small. Therefore, in this case, the traveling-distance for the above recovery is set to a short one. Of course, the above values for various road kinds may be modified circumstantially.

The traveling-distance calculating circuit 22' differs from the previous traveling-distance calculating circuit 22 in that the former has no fixed traveling reference distance LS in advance.

The traveling-distance calculating circuit 22' integrates the vehicle speed at the vehicle's traveling thereby to calculate the traveling-distance. Whenever the map matching at the vehicle-position/traveling-direction calculating circuit 21 is carried out successfully, the circuit 22' resets the traveling-distance and subsequently begins to calculate the traveling-distance from zero.

In case of failure in map matching, the traveling-distance calculating circuit 22' inputs the traveling reference distance LS corresponding to the road kind just before the failure of map matching from the traveling reference distance setting circuit 26 and further compares the so-inputted traveling reference distance LS with the above calculated traveling-distance.

The other constitutions are similar to those of the first embodiment of FIG. 1.

Figure 4:
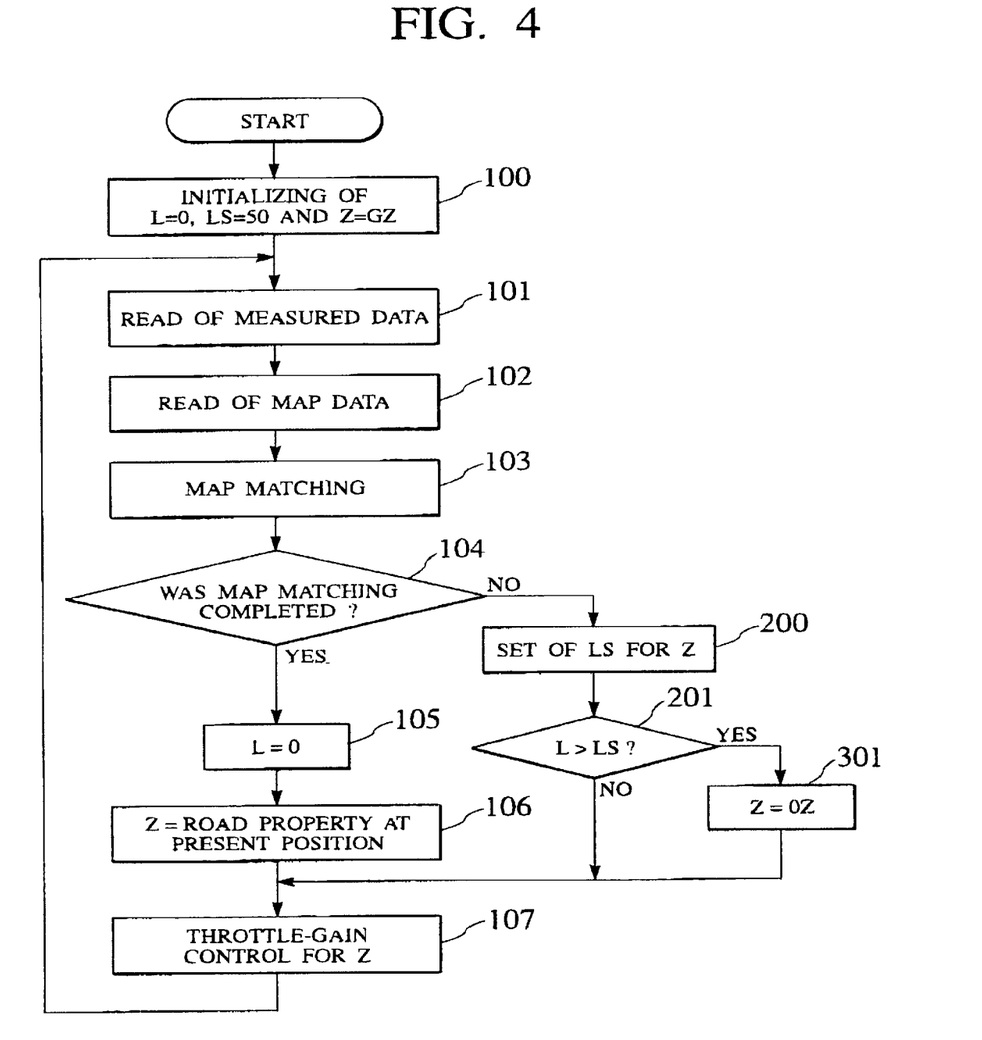
FIG. 4 is a flow chart showing the flow of operations of the vehicle cruising control device of FIG. 2.

FIG. 4 is a flow chart showing the operation of the vehicle cruising device of the second embodiment.

At step 100', it is executed to establish the traveling-distance L of zero (meter) and the road kind Z of GZ (i.e. above principal road) as the initial control data at the starting point of the vehicle's traveling. Additionally, the traveling reference distance setting circuit 26 establishes the traveling reference distance LS of 50 (m) corresponding to the principal road and thereupon, the vehicle begins to start.

The flow of processes from step 102 till step 107 via steps 104 and 105, operations is identical to that of the previously-mentioned embodiment.

If the judgement at step 104 is No, that is, when the map matching is not accomplished in the vehicle-position/traveling-direction calculating circuit 21 successfully, then the routine goes to step 200.

At step 200, it is executed that the traveling reference distance setting circuit 26 reads the traveling reference distance LS corresponding to the road kind Z, out of the inside memory of the road property gain circuit 23 and further outputs the readout distance LS to the traveling-distance calculating circuit 22'.

At next step 201, it is executed in the traveling-distance calculating circuit 22'to compare the traveling-distance LX since the failure of map matching with the reference distance LS.

Including step 301, the processes from step 201 till step 107 are identical to those of the previous embodiment, respectively.

In the second embodiment, the above-mentioned steps 100', 101–104 and 106 constitute the road property detecting unit of the invention and particularly, the steps 101–103 form the traveling-road detecting unit, while the steps 104 and 106 form the road property readout unit of the invention.

Alternatively, the processes at steps 105 and both steps 200 and 201 originating from step 104 form the road property readout unit of the invention.

Similarly to the first embodiment, when the failure of map matching occurs in the cruising control device of the second embodiment, then it maintains to control the vehicle's driving force with the throttle-gain based on the road kind just before the failure of map matching from the failure of map matching till the vehicle's traveling of the designated reference distance LS and subsequently changes the above driving force control to the designated control corresponding to the failure of map matching. Therefore, in the second embodiment, it is possible to produce similar effects to those of the first embodiment.

Additionally, owing to the provision of the traveling reference distance setting circuit 26 for establishment of the reference distance LS corresponding to the road kind just before the failure of map matching, it is possible to switch the control pattern for the driving-force characteristics at appropriate timing meeting the change in cruising environment.

Although three kinds of roads (i.e. freeway, principal road and alleyway) are presented as the road kinds obtained from the map data base in the above embodiments, they may be further subdivided in order to accomplish a fine control for the driving-force characteristics.

Again, although the road kind is employed as one road property throughout the embodiments, the road kind may be converted into a paved road, an unpaved road, an even road, a mountain road, etc. Alternatively, a variety of cruising environments, (e.g. city, suburbs or traffic jam) may be used for the road property.

Although the traveling-distance calculating circuit 22 (22') of the above embodiments is adapted so as to calculate a traveling-distance while using data from the vehicle speed sensor, other independent data may be adopted to calculate the traveling-distance in the modification.

Although the driving-force control unit controls the throttle gain of engine in common with the embodiments, the present invention is applicable to other control where the driving-force character is controlled by adjusting an ignition timing of engine, a gear ratio of transmission or the like.

Japanese patent application No. 2000-47338 (filed on Feb. 24, 2000) is incorporated herein by reference in its entirety.

The scope of the invention is defined with reference to the following claims.

What is claimed is:

1. A vehicle cruising control device for a vehicle, comprising:
   a road property detecting unit for detecting a road property of a road on which the vehicle is traveling; and
   a driving-force control unit for controlling driving-force characteristics of the vehicle in accordance with the detected road property,
   wherein, when the road property detecting unit fails to detect the road property, the driving-force control unit controls the driving-force characteristics of the vehicle in accordance with a preceding road property which has been detected immediately prior to the road property detecting unit failing to detect the road property.

2. The vehicle cruising control device of claim 1, wherein, until the road property detecting unit resumes to detect the road property,
   the driving-force control unit continues to control the driving-force characteristics of the vehicle in accordance with the preceding road property which has been detected prior to the road property detecting unit failing to detect the road property.

3. The vehicle cruising control device of claim 1, wherein, for a shorter one of first and second periods, the driving force control unit continues to control the driving force characteristics of the vehicle in accordance with the preceding road property which has been detected prior to the road property detecting unit resumes to detect the road property,
   wherein the first period represents a time period from a first timing the road property detecting unit fails to detect the road property until a second timing the road property detecting unit resumes to detect the road property, while the second period represents a time period during which the vehicle travels for a predetermined distance from the first timing.

4. The vehicle cruising control device of claim 3, wherein the predetermined distance is established on the ground of the road property which has been detected before the road property detecting unit fails to detect the road property.

5. The vehicle cruising control device of claim 1, wherein the road property detecting unit includes:
- a traveling-road detecting unit which matches map data for a vehicle's position obtained from navigation data of the vehicle to detect a traveling road on which the vehicle is traveling; and
- a road property readout unit which reads the road property corresponding to the traveling road from the map data.

6. The vehicle cruising control device of claim 5, wherein when the traveling-road detecting unit fails to match the map data for the vehicle's position, the road property which has been provided by the road property readout unit is maintained, whereby the driving-force control unit continues to control the driving-force characteristics of the vehicle in accordance with the previous road property which has been detected prior to the road property detecting unit failing to detect the road property.

7. A vehicle cruising control device for a vehicle, comprising:

road property detecting means for detecting a road property of a road on which the vehicle is traveling; and driving-force control means for controlling driving-force characteristics of the vehicle in accordance with the detected road property, wherein, when the road property detecting means fails to detect the road property, the driving-force control means controls the driving-force characteristics of the vehicle in accordance with the road property which has been detected prior to the road property detecting means failing to detect the road property.

8. A method of cruise-controlling of a vehicle, comprising detecting a road property of a road on which the vehicle is travelling, controlling driving force characteristics of the vehicle in accordance with the detected road property, determining a road property detecting unit being inoperable, storing the road property which has been detected prior to the determination of inoperability of the road property detecting unit, and continuing to control the driving force characteristics of the vehicle based on the stored road property.

* * * * *